United States Patent Office 3,373,127
Patented Mar. 12, 1968

3,373,127
WAX EMULSION SYSTEMS
Claude Thomas Bean, Jr., Niagara Falls, and Donald H. Thorpe, Williamsville, N.Y., assignors to Hooker Chemical Corporation, Niagara Falls, N.Y., a corporation of New York
No Drawing. Continuation-in-part of application Ser. No. 143,543, Oct. 9, 1961. This application June 30, 1966, Ser. No. 561,688
10 Claims. (Cl. 260—28)

This is a continuation-in-part of Ser. No. 143,543, filed Oct. 9, 1961, now abandoned.

This invention relates to ammonia-soluble resins for use in wax emulsion systems and to the process for producing such resins. In another aspect the invention relates to improved wax emulsion systems.

Wax emulsion polishes usually comprise the following components: a natural or synthetic wax, an ammonia-soluble resin, an emulsifying agent and a diluent comprising water and a basic component such as ammonia or organic amines. The wax component is dispersed in the water with the aid of the emulsifying agent and the basic component. The resin must be soluble in the basic wax emulsion system and serves to improve the gloss and hardness of the polish and functions as a binder and leveling agent for the wax component. A number of polymers have been used as the ammonia-soluble resins such as rosin, maleic acid and fumaric acid condensation products of rosin, maleic anhydride and fumaric acid condensation products of polyhydric compounds, shellac and casein. Many of the resins used in the prior art have imparted a dark color to the finished polish and hence result in the darkening of the surfaces, such as wood floors and composition floors such as linoleum, rubber, vinyl tile and the like, on which the polish is applied. Likewise, the resins used herebefore have been somewhat deficient by not imparting sufficient water resistance to the wax emulsion polishes.

Accordingly, it is an object of this invention to provide an improved ammonia-soluble resin for use in wax emulsion systems, as well as a process for producing such a resin. Another object of the invention is to provide a wax emulsion resin that is very light in color. A further object of the invention is to provide a wax emulsion polish having superior water resistance and excellent gloss and hardness. Still another object of the invention is to provide a wax emulsion resin that serves as a superior leveling agent for the wax component in a wax emulsion polish. Other objects and advantages will become apparent upon inspection of this specification.

In accordance with this invention there is provided a superior ammonia-soluble resin for use in wax emulsion systems that is prepared by a process comprising the steps of (A) reacting together (1) a fusible, organic solvent soluble condensation product of a phenol and an aldehyde containing condensate units having reactive phenolic hydroxyl groups, and (2) a substance reactive with phenolic hydroxyl groups selected from the group consisting of monooxirane ring compounds, alkenylene halohydrins, alkylene carbonates, and mixtures thereof, in a proportion in the range of about one to about three moles of said substance per phenolic hydroxyl group of said condensation product, to produce a hydroxy ether derivative containing substantially no free reactive phenolic hydroxyl groups, and (B) esterifying the hydroxy ether derivative by reacting it together with between about 0.8 and about one mole per hydroxyl equivalent of a substance selected from the group consisting of carboxylic acids, carboxylic acid anhydrides, carboxylic acid halides, and mixtures thereof to produce a thermoplastic partial ester derivative which has an acid number above at least about 100.

Fusible, organic solvent soluble condensation products of a phenol and an aldehyde suitable for use as starting materials in practicing this invention are well known in the art and can be prepared by well known methods. The phenol-aldehyde condensate should be soluble in organic solvents such as acetone, and should not be advanced to the insoluble C stage or resite stage. When the phenol is phenol itself and the aldehyde is formaldehyde, one type of condensate which is highly satisfactory contains condensation units which may be exemplified by the following formula:

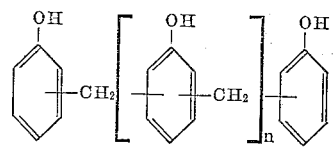

where $n$ represents a numeral varying from about 1 to 10, and often higher provided the resin is fusible and acetone or organic solvent-soluble. Preferably, the phenol-aldehyde condensate is a novolak, which contains more than one mole of phenol per mole of aldehyde.

Examples of phenols which may be used in preparing phenol-aldehyde condensates for use in practicing the invention include phenol itself or substituted phenols having the following general formula:

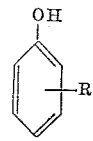

where R may be H, F, Cl, Br or a suitable substituent selected from the following:

(a) Alkyl groups of 1 to 18 carbon atoms in any of their isomeric forms and substituted on the phenolic nucleus in the ortho, meta or para positions;
(b) Alicyclic groups of 5 to 18 carbon atoms such as cyclohexyl, cyclopentyl, methyl cyclohexyl, butyl-cyclohexyl, etc.;
(c) Aromatic or aralkyl groups of 6 to 18 carbon atoms such as phenyl, alpha-methyl benzyl, benzyl, cumyl, etc.;
(d) Alkyl, alicyclic, aryl and aralkyl ketones wherein the hydrocarbon is defined hereinbefore;
(e) Alkyl, alicyclic, aryl and aralkyl carboxylic groups wherein the hydrocarbon is defined hereinbefore, and mixtures thereof.

Suitable substituted phenols include the following: para-tertiary-butylphenol, para-secondary - butylphenol, para-tertiary - amylphenol, para - secondary-amylphenol, para-tertiary-hexylphenol, para - isooctyl - phenol, para-phenylphenol, para - benzylphenol, and para - cyclohexyl-phenol, para-decyl-phenol, para - dodecyl - phenol, para-tetra-decyl-phenol, para-octa-decyl - phenol, para - nonyl-phenol, para-methyl-phenol, para-beta - naphthyl-phenol, para-alpha-naphthyl-phenol, para - pentadecyl - phenol, para-cetyl-phenol, para-cumyl - phenol, para - hydroxy acetophenone, para-hydroxy benzophenone, a phenol reacted or alkylated with limonene in any of its isometric d-, 1-, or dl- forms, a phenol alkylated with styrene, a phenol alkylated with pinene in any of its isomeric α or β forms, a phenol alkylated with oleic acid, as well as the corresponding ortho and meta derivatives such as meta-butyl phenol and ortho-butyl phenol, as well as mixtures thereof. In the case of limonene, experiments show most of limonene ring alkylates with phenol and a lesser proportion forms an ether with phenol. The mole ratio of substituted phenol groups to phenol groups is from zero/one (i.e., unsubstituted) to about 0.75/one, with the preferred range being between zero/one and about 0.6/one.

From the foregoing, it is apparent that substantially any phenol may be used in practicing the present invention provided it has a reactive phenolic hydroxyl group and is capable of reacting with aldehydes such as formaldehyde to produce a condensate. The pure refined phenols may be used, but this is not always necessary. For instance, phenols may be alkylated and then reacted with an aldehyde as the crude product which may contain some poly-alkylated as well as unalkylated phenols. Preferably the phenol-aldehyde resin is prepared and subsequently the phenolic nuclei are alkylated. Mixtures of phenols mentioned herein may also be used.

In producing the parent phenol-aldehyde condensates, any suitable aldehyde or mixtures of aldehydes capable of reacting with a phenol and having not more than, for example, eight carbon atoms is satisfactory provided it does not contain a functional group or structure which is detrimental to the resinification reaction or with esterification or oxyalkylation of the resin. The preferred aldehyde is formaldehyde, which may be in aqueous solution or in any of its low polymeric forms such as paraform or trioxane. Other examples of aldehyde include acetaldehyde, propionaldehyde, butyraldehyde, including isobutyraldehyde, benzaldehyde, furfural, 2-ethylhexanal, ethylbutyraldehyde, heptaldehyde, glyoxal, etc.

The amount of aldehyde to be condensed with the phenol may be varied to prepare novolaks of varying molecular weights and the melting point of the finished resin may be controlled by the mole weight of the novolak. Preferably, the amount of aldehyde varies from 0.5 to 1.0 mole per mole of the phenol when a mono or difunctional phenol is used. In instances where a trifunctional phenol is used, the preferred upper limit of aldehyde may be about 0.85 mole per mole of phenol so as to prevent formation of insoluble and infusible condensates.

In instances where a novolak is prepared using the above-described ratios of aldehyde to phenol, it is preferred that the aldehyde and phenol be reacted using an acid catalyst such as sulfuric, hydrochloric, or oxalic acid, but basic catalysts also may be used. In some instances, catalysts may not be necessary. Examples of alkaline catalysts include ammonia, amines and quaternary ammonium bases. Wetting agents of the anionic type such as sodium alkyl aryl sulfonate, may speed up the reaction when weak acids are used, and also may be present.

In instances where a resole is prepared, more than one mole of formaldehyde per mole of phenol may be useful. The specific phenols and aldehydes which can be used are described above, and the alkaline catalysts described above also are useful. The resoles have carbinol groups as well as phenolic hydroxyl groups which can be reacted with the reagents to be discussed hereinafter.

In accordance with the present invention, improved polymers can be prepared which preferably contain substantially no free reactive phenolic groups (less than about 0.5 percent of the phenolic hydroxyl, for example) present originally in the phenol-aldehyde condensate. The phenol-aldehyde resin can be reacted with a suitable substance designed to etherify or esterify the phenolic hydroxyl groups provided that at least one of the phenolic hydroxyl groups present in each phenol-aldehyde condensate unit is reacted with a substance or substances which are in turn reacted with a polycarboxylic compound.

It is preferred to first hydroxyalkylate the phenolic hydroxyl groups, and then to esterify the resultant groups with a carboxylic acid, acid chloride or acid anhydride. The preferred method of hydroxyalkylation is by reaction with compounds containing a monooxirane ring. Such compounds include ethylene, propylene, butylene, styrene and cyclohexene oxides, glycide and epichlorohydrin.

Many other monoepoxides can be used, but the alkaline oxides containing not more than six carbons are generally used. Additional useful compounds are phenyl glycidyl ether and related compounds prepared from the reaction of epichlorohydrin and monofunctional alkylated and halogenated phenols such as pentachlorophenyl glycidyl ether.

Catalysts for the reaction of the oxirane ring compounds and phenolic hydroxyl groups are alkali or alkaline earth hydroxides, primary amines, secondary amines, tertiary amines or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. The reaction may be carried out at temperatures of fifty to two hundred and fifty degrees centigrade, and preferably in the absence of solvents, although solvents may be used to reduce viscosity.

The phenolic hydroxyl of the novolaks may also be hydroxyalkylated by reacting alkylene halohydrins with the phenolic hydroxyl using equivalent amounts of an alkali metal hydroxide to bring about the reaction. Suitable alkylene halohydrins are ethylene chloro- or bromohydrins, propylene chloro- or bromohydrins, 2,3-butylene chloro- or bromohydrins, glyceryl chloro- or bromohydrins.

Another method for hydroxyalkylating novolaks is reaction with alkylene carbonates such as ethylene carbonate, and propylene carbonate, using a catalyst such as potassium carbonate.

The novolaks or resoles should be reacted until substantially all of the reactive phenolic hydroxyl groups have reacted (leaving preferably less than 0.5 percent of the phenolic hydroxyls unreacted). That is, the resultant hydroxy ether derivative should contain substantially no free reactive phenolic hydroxyl groups. This is desirable to prevent oxidation and undesirable darkening in the resultant product. At least one mole of alkylene oxide or other etherifying or esterifying agent is required per mole of phenolic hydroxyl. However, resins prepared by reaction with up to three moles of alkylene oxide per mole of phenolic hydroxyl are useful. It is required that there be at least one hydroxyalkyl group per condensate molecule. It is preferred to use from about one to about two molar equivalents of the substance. At molar equivalents above about three, the resin becomes more sensitive to water and has a greater melting point depression.

A variety of acids, acid halides, acid anhydrides, etc., or mixtures thereof may be used for reaction with the hydroxyalkyl phenylethers of novolaks or resoles such as prepared in accordance with the invention. For example, the hydroxyalkyl novolaks may be esterified with 0.5 to 1.0 moles of a dicarboxylic acid anhydride per hydroxyl equivalent. The carboxylic acids and the corresponding acid chlorides and acid anhydrides include phthalic, nadic (i.e., endo-cis-bicyclo-(2.2.1)-5-heptene-2,3-dicarboxylic), hexahydrophthalic, tetrahydrophthalic, tetrachlorophthalic, methyl nadic (i.e., methyl bicyclo-(2.2.1)-heptene-2,3-dicarboxylic), and chlorendic. These carboxylic compounds are the preferred carboxylic compounds for use in the invention because their use in the compositions maintains the melting point of the ammonia-soluble resin above about sixty degrees centigrade. The preferred range of melting point is sixty to one hundred and forty degrees centigrade. Less preferred carboxylic compounds that can be used in the compositions of the invention are the acids, acid chlorides and anhydrides such as maleic, chloromaleic, ethylmaleic, itaconic, citraconic, mesaconic, succinic, glutaric, trimellitic, and pyromellitic acid dianhydride. The acid bromides and acid iodides corresponding to the aforementioned acid chlorides are also suitable, but are more costly to use. The preferred form of carboxylic compound is the acid anhydride, because in this form any tendency to produce a gel, i.e., a cross-linked material, is minimized.

It is to be understood that a monocarboxylic compound may be used along with the above-described polycarboxylic compound, provided the resultant resin has an acid number above at least about 100, as defined in the claims.

The esterification of the hydroxyether derivative is preferably carried out at a temperature in the range of about one hundred to one hundred and fifty degrees centigrade, although higher and lower temperatures can be used. When polycarboxylic acids are used, the progress of the esterification reaction can be monitored by measuring the quantity of water of esterification that is produced. Small quantities of toluene or xylene can be used as azeotroping agents to facilitate removal of the water. When acid chlorides are used, it is preferred to use solvents during the reaction. The acid chloride can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed such as by stripping at the completion of the reaction. The progress of the reaction involving the acid chlorides can be monitored by measuring the quantity of hydrogen chloride evolved during the course of the esterification. Moreover, in the reactions involving the acid chlorides, it is advantageous to use a hydrogen halide acceptor such as amines and strong bases. Preferred acceptors are tertiary amines such as pyridine, and triethylamine. The remaining acid chloride group from the dibasic acid chlorides is hydrolyzed to the acid.

When esterifying the hydroxyether derivative, it should be reacted together with between about 0.8 and about one mole of polycarboxylic compound per hydroxyl equivalent in order to obtain solubility in ammonia solutions. The resultant thermoplastic partial ester derivative has an acid number above at least about 100. At acid numbers below about 100, the resins may not be completely soluble in ammonia solutions. A preferred range of acid number is between about 110 to about 285. Even more preferred is the range of acid number between about 110 and 220.

A solution of the ammonia-soluble resin is readily prepared for use in a wax emulsion system. In a typical preparation, one hundred parts of the ammonia-soluble resin and five hundred parts of water are charged to an enclosed vessel which will not permit less of volatile materials. While agitating the mixture in the vessel, about twenty-five parts of a twenty-eight percent ammonium hydroxide solution are added to the mixing vessel and agitation is continued until the solution of the resin is complete. Gentle heating can be employed to speed the solubilization. In the preparation of the resin solution, the ammonia can be replaced in whole or in part by other alkaline materials such as volatile organic amines. Suitable volatile organic amines include the aliphatic and hydroxy aliphatic amines having boiling points at 760 millimeters to below about 200 degrees centigrade, for example, morpholine, ethoxypropylamine, 2-amino-2-methyl-1-propanol, ethanolamine, dimethyl ethanolamine, ethylene diamine and triethylamine. The resin solutions generally contain from about five to about twenty-five weight percent solids, preferably from about fifteen to twenty percent solids.

Many waxes, both natural and synthetic, as well as wax-like polymeric materials are suitable for use in wax emulsion polishes. Typical of the generally preferred waxes are carnauba and microcrystalline waxes. Typical of the wax-like polymeric materials are the polyethylene waxes. One such polyethylene wax is prepared by subjecting ethylene, either alone, or in the presence of a co-reactant to temperatures between about 150 and 300 degrees centigrade and pressures ranging from 500 to 7,000 pounds per square inch gauge. The resulting polymer is a solid, hard, waxy polymer of ethylene, which is a saturated aliphatic material characterized by a recurring —$CH_2$— group, having an average molecular weight between about one thousand and about three thousand. The polymer is subjected in the liquid phase to the action of an oxygen-containing gas to cause reaction of at least about five pounds of oxygen per one hundred pounds of wax to provide an oxidized polyethylene wax containing at least about three percent of oxygen based on the weight of the oxidized wax.

Wax emulsions for use in the wax emulsion systems are prepared by dispersing the wax component in water with the aid of an emulsifying agent. Suitable emulsifying agents are the organic amines, higher fatty acids and mixtures thereof. The organic amines that can be used are those enumerated hereinbefore as well as triethanolamine. Typical higher fatty acids include the saturated and unsaturated aliphatic acids having from twelve to eighteen carbon atoms such as oleic, linoleic, linolenic, lauric, palmitic and stearic. The wax emulsions generally contain from about five to about twenty-five weight percent solids, preferably about fifteen to about twenty percent solids.

A typical wax emulsion containing carnauba wax is prepared as follows.

Wax emulsion A 9.8 parts of refined carnauba wax are mixed with 4.1 parts of a terpene-phenol resinous condensation product. The mixture is heated with agitation to 350 degrees Fahrenheit to obtain a uniform blend, and is then cooled to 212 degrees Fahrenheit, whereupon 2.2 parts of oleic acid are added to the mixture. The mixture is reheated to 212 degrees Fahrenheit and held at this temperature with agitation until the mixture is uniformly fluid, at which time 1.5 parts of morpholine are added. Mixing is continued until the mixture is uniformly fluid. The resulting resin-wax-emulsifier mixture is added with rapid agitation to 81 parts of boiling water and the emulsion is cooled to room temperature.

A typical polyethylene wax emulsion is prepared as follows.

Wax emulsion B 13.9 parts of AC polyethylene 629, manufactured by Allied Chemical and Dye Corporation, are melted at a temperature not exceeding 270 degrees Fahrenheit. To the melted wax, 2.1 parts of oleic acid are added with agitation and the mixture is reheated to 230 degrees Fahrenheit and agitated until it is uniformly fluid, whereupon 2.4 parts of morpholine are added. The resulting mixture is reheated to 250 degrees Fahrenheit and agitation is continued until a uniform blend is produced. The resulting mixture is added to 81.6 parts of water that is just below the boiling point and the emulsion is quickly cooled to room temperature with agitation.

It is within the scope of the invention to incorporate other components into the wax emulsion systems, for example, the emulsions or latices of polymers or copolymers such as styrene, vinyl chloride, acrylic, and methacrylic esters. Such emulsions can contain five to twenty-five percent solids, but will preferably contain about ten to twenty percent solids. Suitable components of this type are emulsions of high molecular weight polystyrene resins having molecular weight above five thousand, preferably those having molecular weight above one hundred thousand. Those which are aqueous emulsions formed in the preparation of the polystyrene resins and which are commonly called latices are generally preferred.

A typical polymer emulsion is prepared as follows.

Polymer emulsion C 34.9 parts of U-2003 Ubatol, a polystyrene product manufactured by the U.B.S. Chemical Corporation, are charged into an enclosed mixing vessel. Using moderate agitation there is added to the vessel 11.5 parts of water and mixing is continued until the mixture is uniform, whereupon a solution of 1.1 parts of dibutyl phthalate and 0.9 part of tris-butoxyethyl phosphate and 51.6 parts of water are added to the vessel. Agitation is continued for twenty minutes.

The aqueous emulsion polishes of this invention are usually prepared by blending together the several components such as the ammonia-soluble resin solution, the wax emulsion and any other emulsions or solutions that may be desired in a particular formulation. The wax emulsion systems preferably contain between about five to twenty-five parts of total solids per one hundred parts by weight of dispersion. The solids content generally comprises about one to fifteen parts of ammonia-soluble resin and one to fifteen parts of wax per hundred parts by weight of the dispersion. Such polishes are characterized by very light color, as well as improved gloss, hardness and water resistance. The foregoing description and the following specific examples are for purposes of illustration only and are not intended to unduly limit the invention.

The following examples illustrate the preparation of phenol-aldehyde resins for use in the compositions of this invention.

Example 1

Into a ten gallon glass-lined reactor are charged 7,050 parts of phenol, 35 parts of oxalic acid and 14 parts of an anionic wetting agent. The phenol is heated to 90 to 100 degrees centigrade, and then 4,040 parts of a 37 percent formaldehyde solution are added over a period of about one hour. The resin is refluxed until free of formaldehyde and then water and unreacted phenol are removed by distillation, which is completed at 200 degrees centigrade under vacuum. There is produced 6,500 parts of a phenol-aldehyde resin having an average molecular weight of about 520.

Example 2

Phenol (500 parts), oxalic acid dihydrate (2.5 parts) and sodium alkyl aryl sulfonate wetting agent (0.5 part) were charged into a pressure kettle and heated to 105 degrees centigrade. Formalin (37.2 percent, 244 parts) was added subsurface at such a rate as to maintain reflux. After all formalin was added, reflux was continued for one hour. The resultant novolak was then dehydrated starting with partial vacuum and finishing at 175 degrees centigrade with full vacuum (approximately 29 inches of mercury) to remove all free phenol. A sample removed at this time had a melting point of 60 to 70 degrees centigrade and an average molecular weight of 440 by vapor pressure osmometer in tetrahydrofuran.

Example 3

Into a ten gallon, glass-lined reactor are charged 6,850 parts of phenol and 6.6 parts of sulfuric acid. The solution is heated to 100 degrees centigrade, whereupon 2,912 parts of styrene are added slowly to the reactor. Upon completion of the styrene addition, the styrenated phenol is cooled to 100 degrees centigrade, and 4,540 parts of a thirty-seven percent formaldehyde solution are added to the reactor. The reaction mixture is refluxed until free of formaldehyde, after which water is removed by distillation, which is completed at 200 degrees centigrade under vacuum. A yeld of 10,900 parts of a phenol-aldehyde resin containing 0.4 mole of styrene per mole of phenol is obtained.

In the same manner, additional phenol-aldehyde resins are produced which contain 0.5, 0.625, 0.75 and one mole of styrene per mole of phenol.

Example 4

Another phenol-aldehyde resin is prepared in the manner described in Example 2 except that 3,304 parts of vinyl toluene are used instead of styrene. The resulting resin contained 0.5 mole of vinyl toluene per mole of phenol.

Example 5

This example illustrates the process wherein the phenol-aldehyde resin is alkylated after the preparation of the resin. 5,200 parts of the resin produced in Example 1 are charged to a five gallon reactor and heated to 120 to 130 degrees centigrade, after which 5.2 parts of sulfuric acid are added to the vessel. 4,080 parts of limonene are added to the mixture and the temperature is raised to 160 degrees centigrade. After two hours, a vacuum as applied to the reactor and 365 parts of unreacted limonene are removed, indicating that 0.55 mole of limonene has reacted per mole of phenol. The hydroxyl number of the finished resin is 230 compared with a theoretical hydroxyl number of 313 for a ring alkylated phenol, which indicates that about one-third of the limonene forms a stable phenol ether.

Example 6

The novolak of Example 2 was cooled to 150 degrees centigrade, sulfuric acid (0.416 part) added and d-limonene (297 parts) added on the surface at such a rate that the temperature exothermed to and was maintained at 160–170 degrees centigrade during the addition and for one hour after the addition was completed. Vacuum was applied and 10.5 parts of unreacted d-limonene were removed. The melting point of the alkylated novolak was 80–90 degrees centigrade, average molecular weight was 706 and the hydroxyl number was 212. The molecular weight indicates that about one-half mole of d-limonene was added per each phenol nucleus. The hydroxyl number of 212 compared to a theoretical hydroxyl number of 327 for a ring alkylated phenol shows that about one-third of the d-dimonene forms a stable phenol ether.

Example 7

Into a stirred pressure reactor were charged 1,285 parts of a novolak prepared as in Example 1. The novolak was heated to 150 degrees centigrade and 1.28 parts of sulfuric acid were added. Over a period of one hour, 1,009 parts of d-limonene were added and the temperature was maintained for one additional hour. Vacuum was then applied and 62 parts of unreacted d-limonene were removed. The resultant alkylated novolak had a hydroxyl number of 196 milligrams of KOH per gram which indicated an equivalent weight of 286.

Example 8

Into a stirred pressure reactor were charged 1,410 parts of phenol and 14.1 parts of 37 percent hydrochloric acid. The mixture was heated to 100 degrees centigrade and 420 parts of paraldehyde were added over a one hour period. The resin was refluxed for one hour at which time all of the acetaldehyde had reacted. Water of reaction, hydrochloric acid and free phenol were removed by distillation, finishing under vacuum at 180 degrees centigrade. A yield of 1,420 parts was obtained.

Example 9

A novolak was made as described in Example 8 except 700 parts of isobutyraldehyde were substituted for acetaldehyde. A yield of 1,720 parts was obtained.

Example 10

5,200 parts of the resin produced in Example 1 was added to a glass-lined, pressure reactor and heated to about 150 degrees centigrade. 86 grams of trimethylamine were pumped into the reactor, followed by 8,680 parts of propylene oxide at a rate to maintain the temperature at 150 to 170 degrees centigrade and the pressure below 180 pounds per square inch gauge. After one hour, the pressure had dropped to 50 pounds per square inch gauge, and the pressure was released and excess propylene oxide removed by distillation which was completed under vacuum The hydroxy propylated resin had a phenolic-hydroxyl content of less than 0.1 percent and a hydroxyl number of 346.

*Example 11*

To the alkylated novolak of Example 6 were added 6.95 parts of sodium acetate, the system was purged with nitrogen and the temperature was raised to 180 degrees centigrade. The kettle was sealed off and propylene oxide (204.0 parts) was pumped in over a four hour period with the pressure maintained between 15 and 25 pounds per square inch gauge. One-half hour after the propylene oxide was all in, the pressure had dropped to zero pounds per square inch gauge. A sample removed at this time analyzed for zero percent phenolic hydroxyl had an aliphatic hydroxyl number of 182.

*Example 12*

The alkylated novolak of Example 7 was heated to 180 degrees centigrade and 22.3 parts of sodium acetate were added. The reactor was sealed off and 905 parts of propylene oxide were pumped in over a period of two hours holding the pressure below 30 pounds per square inch gauge. After a reaction period of one hour, the pressure had dropped to zero pounds per square inch gauge. A sample of the hydroxy-propylated d-limonene novolok had a hydroxyl number of 128 and a phenolic hydroxyl content of zero percent.

The substituted phenolic resins of Examples 3, 4 and 5 are hydroxy-propylated in the manner described in Example 10. A reaction time of three to four hours is required to reduce the phenolic-hydroxyl value to less than 0.2 percent. The following results are obtained.

TABLE I

| Example No. | Substituent | Mole Substituent per Mole Phenol | Phenolic Hydroxyl Content, wt. percent | Hydroxyl Number |
|---|---|---|---|---|
| 13 | Styrene | 0.4 | 0.10 | 270 |
| 14 | Vinyl Toluene | 0.5 | 0.15 | 246 |
| 15 | Limonene | 0.55 | 0.12 | 164 |
| 16 | Styrene | 0.625 | 0.10 | 246 |
| 17 | do | 0.50 | 0.09 | 261 |
| 18 | do | 0.75 | 0.13 | 233 |
| 19 | do | 1.00 | 0.15 | 211 |

The phenolic resins of Examples 8 and 9 are hydroxypropylated in the manner described in Example 11. The results are shown in Table II.

TABLE II

| Example No. | Substituent | Mole Substituent per Mole Phenol | Phenolic Hydroxyl Content, wt. percent | Hydroxyl Number |
|---|---|---|---|---|
| 20 | | 8 | 0 | 0.2 | 332 |
| 21 | | 9 | 0 | 0.3 | 285 |

The resins of Examples 1 and 3 are reacted with ethylene oxide in the same manner as described in Example 10, except that one percent triethylamine is used as catalyst. The results are shown in Table III.

TABLE III

| Example No. | Substituent | Mole Substituent per Mole Phenol | Phenolic Hydroxy Content, wt. percent | Hydroxyl Number |
|---|---|---|---|---|
| 22 | None | 0 | 0.05 | 374 |
| 23 | Styrene | 0.4 | 0.10 | 289 |

The following examples illustrate the preparation of ammonia-soluble resins of the invention.

*Example 24*

4,860 parts of the resin produced in Example 10 are charged into a five gallon, glass-lined reactor and heated to a temperature of 120 to 130 degrees centigrade. 4,380 parts of phthalic anhydride are added to the reactor. After about one hour, the resulting resin which has an acid number of 210 is cast into a tray.

*Examples 25–43*

In a manner similar to that described in Example 24, the hydroxy-alkylated phenolic resins of Examples 10 through 23 are reacted with the following carboxylic compounds: phthalic anhydride, tetrahydrophthalic anhydride, tetrachlorophthalic anhydride, succinic anhydride, maleic anhydride, nadic anhydride (i.e., endo-cis-bicyclo-(2.2.1)-5-heptene-2,3-dicarboxylic anhydride) and trimellitic anhydride. The properties of the resulting resins are shown in Table IV, together with the results of Example 21.

TABLE IV

| Example No. | Resin Alkylated With— | Ratio of Hydrocarbon Substituent | Alkylene Oxide | Carboxylic Compound | Acid No. | Melting Point,[1] °C. | Gardner[2] Color |
|---|---|---|---|---|---|---|---|
| 24 | None | | Propylene oxide | Phathalic anhydride | 210 | 68–76 | <1 |
| 25 | do | | Ethylene oxide | do | 214 | 63–72 | 4 |
| 26 | do | | Butylene oxide | do | 200 | 66–86 | 4 |
| 27 | do | | Propylene oxide | Tetrahydrophthalic anhydride | 194 | 72–76 | 2 |
| 28 | Styrene | 0.4/1 | do | Phthalic anhydride | 175 | 64–80 | <1 |
| 29 | do | 0.5/1 | Ethylene oxide | do | 180 | 51–64 | 7 |
| 30 | do | 0.5/1 | Propylene oxide | Succinic anhydride | 183 | 55–65 | 4 |
| 31 | Vinyl toluene | 0.5/1 | do | Phthalic anhydride | 180 | 71–88 | <1 |
| 32 | Limonene | 0.55/1 | do | do | 132 | 78–87 | 5 |
| 33 | Styrene | 0.5/1 | do | Nadic anhydride | 212 | 65–75 | 1 |
| 34 | do | 0.5/1 | do | Phthalic anhydride | 189 | 66–82 | <1 |
| 35 | do | 0.625/1 | do | do | 176 | 71–84 | 1 |
| 36 | do | 0.75/1 | do | do | 181 | 69–84 | 1 |
| 37 | do | 0.5/1 | do | Maleic anhydride | 178 | 48–68 | 5 |
| 38 | do | 1/1 | do | do | 167 | 73–86 | 1 |
| 39 | Limonene | 0.5/1 | do | do | 143 | 72–81 | 2 |
| 40 | do | 0.57/1 | do | do | 102 | 64–73 | 2 |
| 41[3] | None | | do | do | 198 | 65–74 | 1 |
| 42[4] | do | | do | do | 170 | 69–77 | 2 |
| 43 | Limonene | 0.5/1 | do | Trimellitic | 243 | 119–144 | 5 |

[1] Melting point determined by heating a ground sample of the resin in a capillary tube in an oil bath at about 1.5 degrees centigrade per minute and observing the temperature at which the sample becomes fluid.
[2] Gardner color determined by comparing the color of a sample with Gardner color standards manufactured by Gardner Laboratories, Bethesda, Maryland.
[3] Novolak made with acetaldehyde.
[4] Novolak made with isobutyraldehyde.

The following examples illustrate the preparations of ammonia solutions of the ammonia-soluble resins.

Example 44

One hundred and sixty parts of the resin produced in Example 24 are ground to a coarse consistency and are then added with stirring to a solution of 40 parts of 28 percent aqueous ammonia in 800 parts of water at room temperature. The resin dissolves rapidly and completely in the ammonia to give a clear, light colored solution.

The ammonia-soluble resins produced in Example 25 through 43 are also treated in the manner described in Example 44. The properties of the ammonia solution are shown in Table V and are compared with the properties of a commercial ammonia-soluble resin that is treated in a manner similar to that described in Example 44. However, in the case of the commercial ammonia-soluble resin, it is necessary to dissolve the resin in a hot ammonia solution and then to filter insoluble material out of the solution. A comparison of the results shown in Table V indicates that the color of the ammonia solution of the commercial resin is much darker than that of the resins produced in accordance with the instant invention.

TABLE V.—AMMONIACAL SOLUTIONS

| Example No. | Resin of Example No. | Color Gardner | Viscosity Gardner | Appearance |
|---|---|---|---|---|
| 44 | 24 | 1 | <A | Clear solution. |
| 45 | 25 | 2 | <A | Clear. |
| 46 | 26 | 2 | <A | Do. |
| 47 | 27 | <1 | <A | Do. |
| 48 | 28 | <1 | <A | Do. |
| 49 | 29 | 4 | <A | Do. |
| 50 | 30 | 4 | <A | Slightly hazy. |
| 51 | 31 | <1 | <A | Clear. |
| 52 | 32 | 1-2 | <A | Do. |
| 53 | 33 | <1 | <A | Do. |
| 54 | 34 | <1 | <A | Do. |
| 55 | 35 | | | Hazy, two phase. |
| 56 | 36 | | | Do. |
| 57 | 37 | 5 | <A | Clear. |
| 58 | 38 | | | Hazy, gel. |
| 59 | 39 | 2 | <A | Slightly hazy. |
| 60 | 40 | 2 | <A | Clear. |
| 61 | 41 | 1 | <A | Do. |
| 62 | 42 | 2 | <A | Do. |
| 63 | 43 | 5 | <A | Slightly hazy. |
| 64 | (¹) | 9 | <A | Clear, dark amber. |

¹ Commercial resin.

The ammonia solutions prepared in Examples 44 through 63 are formulated with various amounts of the components designated in the foregoing discussion as "Wax Emulsion A," "Wax Emulsion B," and "Polymer Emulsion C," to produce self-polishing floor waxes. The formulations are shown in Table VI. The polishes prepared in accordance with the invention in Examples 65–88 were applied to vinyl asbestos and linoleum floor coverings. The observed performance characteristics are also shown in Table VI, where these performance characteristics are compared with those of polishes made from the commercial resin of Example 64 as well as with three commercial polishes. The comparison shows that the polishes produced in accordance with the instant invention are as good or better than commercially available polishes insofar as such properties as gloss, leveling characteristics, and water resistance. It was previously demonstrated in the examples shown in Table V that the ammonia-soluble resins of the invention are vastly superior in color to those of commercially available resins.

Example 89

This example illustrates the use of an alkylene halohydrin in the invention.

Into a five liter, three-necked flask are charged 520 grams of a novolak prepared as in Example 1 and 600 grams of ethyl alcohol. To the mixture are added 880 grams of a 33 percent sodium hydroxide solution. The solution is heated to 80 degrees centigrade and 443 grams of ethylene chlorohydrin are added over a period of one hour. The reaction is refluxed until free of phenolic hydroxyl, the alcohol is distilled off and the resin is washed with hot water until free of salt. The residue is dried by heating to 150 degrees centigrade under vacuum.

The resin is reacted with phthalic anhydride and dissolved in ammonia as described in Examples 24 and 44.

The following examples illustrates the use of alkylene carbonates in the invention.

Example 90

312 grams of novolak prepared as in Example 1, 267 grams ethylene carbonate and 1.5 grams of potassium carbonate are mixed together and heated to 170 to 180 degrees centigrade under a stream of $N_2$. Carbon dioxide is evolved. After six hours, the resin is free of phenolic hydroxyl and has a hydroxyl number of 357.

Example 91

312 grams of novolak prepared as in Example 1, 290 grams propylene carbonate and 1.5 grams of potassium carbonate are mixed together and heated to 170 to 180 degrees centigrade under a stream of $N_2$ for twelve hours. Carbon dioxide is evolved. The resin is free of phenolic hydroxyl and has a hydroxyl number of 338.

The resins of Examples 90 and 91 are reacted with phthalic anhydride and dissolved in ammonia as described in Examples 24 and 44.

Example 92

Into a reaction vessel equipped with a reflux condenser are charged three moles of isophthalyl chloride which is

TABLE VI

| Example No. | Resin Solution of Example No. | Resin Solution | Parts By Weight | | | Performance Characteristics | | |
|---|---|---|---|---|---|---|---|---|
| | | | Wax Emulsion A | Wax Emulsion B | Polymer Emulsion C | Gloss | Leveling | Water Resistance |
| 65 | 44 | 20 | | 5 | 25 | Fair to good | Poor | Fair to good. |
| 66 | 46 | 15 | 10 | | 25 | do | Fair to good | Fair. |
| 67 | 46 | 20 | | 5 | 25 | do | Fair | Do. |
| 68 | 47 | 15 | 10 | | 25 | Poor | Fair to good | Fair to good. |
| 69 | 47 | 20 | | 5 | 25 | do | Poor | Poor. |
| 70 | 48 | 20 | | 5 | 25 | Good | Good | Good. |
| 71 | 48 | 20 | 10 | | 25 | do | do | Do. |
| 72 | 51 | 60 | 40 | | 100 | do | do | Do. |
| 73 | 51 | 80 | | 20 | 100 | do | do | Do. |
| 74 | 52 | 10 | 25 | | 65 | do | do | Do. |
| 75 | 54 | 60 | 60 | | 100 | do | do | Do. |
| 76 | 54 | 80 | | 20 | 100 | do | do | Do. |
| 77 | 64 | 60 | 40 | | 100 | do | do | Do. |
| 79 | 64 | 80 | | 20 | 100 | do | do | Do. |
| 80 | 64 | 10 | 25 | | 65 | do | do | Do. |
| 81 | (¹) | | | | | Fair to good | Fair to good | Fair. |
| 82 | (²) | | | | | do | Fair | Good. |
| 83 | (³) | | | | | Good | Good | Do. |
| 84 | 59 | 20 | | 5 | 25 | do | do | Do. |
| 85 | 60 | 20 | | 5 | 25 | do | do | Fair to good. |
| 86 | 61 | 20 | | 5 | 25 | do | do | Do. |
| 87 | 62 | 20 | | 5 | 25 | do | do | Good. |
| 88 | 63 | 20 | | 5 | 25 | do | Fair to good | Fair to good. |

¹ Commercial Polish A. ² Commercial Polish B. ³ Commercial Polish C.

heated to 120 degrees centigrade. To the vessel are slowly added 162 parts of the resin described in Example 10, dissolved in 200 parts of dioxane. The evolved hydrogen chloride is swept out of the vessel with a stream of nitrogen and collected in a water trap. Heating is continued until one mole of hydrogen chloride is collected. The reflux condenser is removed and the dioxane and excess acid chloride are distilled off under vacuum to a pot temperature of 150 degrees centigrade at one millimeter mercury absolute pressure.

The resin is cooled to 130 degrees centigrade, 36 parts of water are added slowly and the evolved hydrogen chloride collected in a water trap. After one mole of hydrogen chloride is collected, vacuum is applied to remove the excess water. The resulting resin is dissolved in ammonia as described in Example 44.

*Example 93*

Three moles of adipic acid are placed in a reaction vessel equipped with a reflux condenser and heated to 120 degrees centigrade. To the vessel are added 160 parts of the resin described in Example 10, and 1.6 parts of paratoluenesulfonic acid dissolved in 200 parts of xylene. Heating is continued until one mole of water is driven off. Then the reflux condenser is removed and the xylene and excess adipic acid are evaporated under vacuum at 150 degrees centigrade and one millimeter mercury absolute pressure.

The resin is cooled to room temperature and dissolved in ammonia as described in Example 44.

In this specification, the term "ammonia-soluble resin" is used to define a resin that is soluble at 30 degrees centigrade in an aqueous ammonium hydroxide solution having a concentration in the range of five to twenty-five percent.

What is claimed is:

1. A wax emulsion polishing composition comprising a wax component and an ammonia-soluble resin in a weight ratio of between about 1:15 and 15:1, said ammonia-soluble resin comprising a thermoplastic ester derivative prepared by the process comprising the steps of (A) reacting together (1) a fusible, organic solvent soluble condensation product of a phenol and an aldehyde containing condensate units having reactive phenolic hydroxyl groups, said phenol being defined by the formula:

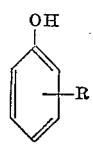

where R may be H, F, Cl, Br or a suitable substituent selected from (a) alkyl groups of 1 to 18 carbon atoms, (b) alicyclic groups of 5 to 18 carbon atoms, (c) aromatic or aralkyl groups of 6 to 18 carbon atoms, (d) alkyl, alicyclic, aryl and aralkyl ketones wherein the respective hydrocarbon is defined as in (a), (b), and (c), (e) alkyl, alicyclic, aryl and aralkyl carboxylic groups wherein the respective hydrocarbon is defined as in (a), (b) and (c), and (f) mixtures thereof wherein when the phenol is a mixture of phenol itself and an above-defined substituted phenol the mole ratio of substituted phenol groups to phenol groups is between zero to one and about 0.75 to one, and (2) a substance reactive with the phenolic hydroxyl groups selected from the group consisting of monooxirane ring compounds, alkylene halohydrins, alkylene carbonates, and mixtures thereof, in a proportion in the range of about one to about three moles of said substance per phenolic hyroxyl group of said condensation product, to produce a hydroxy ether derivative containing substantially no free reactive phenolic hydroxyl groups, and (B) esterifying the hydroxy ether derivative by reacting it together with between about 0.8 and about one mole per hydroxyl equivalent of a substance selected from the group consisting of polycarboxylic acids, polycarboxylic acid anhydrides, polycarboxylic acid halides and mixtures thereof to produce a thermoplastic ester derivative which has an acid number above at least about 100.

2. A wax emulsion system comprising from about one to about 15 parts by weight of a wax component, from about 1 to about 15 parts by weight of an ammonia-soluble resin, comprising a thermoplastic ester derivative prepared by the process comprising the steps of (A) reacting together (1) a fusible, organic solvent soluble condensation product of a phenol and an aldehyde containing condensate units having reactive phenolic hydroxyl groups, said phenol being defined by the formula:

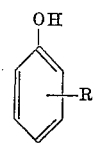

where R may be H, F, Cl, Br or a suitable substituent selected from (a) alkyl groups of 1 to 18 carbon atoms, (b) alicyclic groups of 5 to 18 carbon atoms, (c) aromatic or aralkyl groups of 6 to 18 carbon atoms, (d) alkyl, alicyclic, aryl and aralkyl ketones wherein the respective hydrocarbon is defined as in (a), (b), and (c), (e) alkyl, alicyclic and aralkyl carboxylic groups wherein the respective hydrocarbon is defined as in (a), (b) and (c), and (f) mixtures thereof wherein when the phenol is a mixture of phenol itself and an above-defined substituted phenol the mole ratio of substituted phenol groups to phenol groups is between zero to one and about 0.75 to one, and (2) a substance reactive with the phenolic hydroxyl groups selected from the group consisting of monooxirane ring compounds, alkylene halohydrins, alkylene carbonates, and mixtures thereof, in a proportion in the range of about one to about three moles of said substance per phenolic hydroxyl group of said condensation product, to produce a hydroxy ether derivative containing substantially no free reactive phenolic hydroxyl groups, and (B) esterifying the hydroxy ether derivative by reacting it together with between about 0.8 and about one mole per hydroxyl equivalent of a substance selected from the group consisting of polycarboxylic acid, polycarboxylic acid anhydrides, polycarboxylic acid halides and mixtures thereof to produce a thermoplastic ester derivative which has an acid number above at least about 100, an emulsifying agent, and a diluent comprising water and an alkaline compound selected from the group consisting of ammonia, a volatile organic amine, and mixtures thereof, said wax emulsion system containing between about five to about 25 parts of total solids per hundred parts by weight of dispersion.

3. A wax emulsion polishing composition comprising a wax component and an ammonia-soluble resin in a weight ratio of between about 1:15 and 15:1, said ammonia-soluble resin comprising the thermoplastic ester derivative prepared by the process comprising the steps of (A) reacting together (1) a fusible, organic solvent soluble condensation product of a phenol and formaldehyde containing condensate units of a reactive phenolic hyroxyl group, said phenol being defined by the formula:

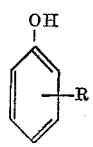

where R may be H, F, Cl, Br or a suitable substituent selected from (a) alkyl groups of 1 to 18 carbon atoms, (b) alicyclic groups of 5 to 18 carbon atoms, (c) aromatic or aralkyl groups of 6 to 18 carbon atoms, (d) alkyl, alicyclic, aryl and aralkyl ketones wherein the respective hydrocarbon is defined as in (a), (b), and (c), (e) alkyl, alicyclic, aryl and aralkyl carboxylic groups wherein the respective hydrocarbon is defined as in (a), (b) and (c), and (f) mixtures thereof wherein when the phenol is a mixture of phenol itself and an above-defined substituted phenol the mole ratio of substituted phenol groups to phenol groups is between zero to one and about 0.75 to one and (2) an alkylene oxide, in a proportion in the range of about one to about three moles of said alkylene oxide per phenolic hydroxyl group of said condensation product, to produce a hydroxy ether derivative containing substantially no free reactive phenolic hydroxyl groups, and (B) esterifying the hydroxy ether derivative by reacting it together with between about 0.8 and about one mole per hydroxyl equivalent of a polycarboxylic acid anhydride to produce the thermoplastic ester derivative which has an acid number above at least about 100.

4. The wax emulsion polishing composition of claim 3 wherein in the ammonia soluble resin the alkylene oxide used to produce the hydroxy ether derivative is propylene oxide.

5. The wax emulsion polishing composition of claim 3 wherein in the ammonia soluble resin the alkylene oxide used to produce the hydroxy ether derivative is ethylene oxide.

6. The wax emulsion polishing composition of claim 3 wherein in the ammonia soluble resin the phenol is alkylated with styrene.

7. The wax emulsion polishing composition of claim 3 wherein in the ammonia soluble resin the phenol has been reacted with limonene.

8. The wax emulsion polishing composition of claim 3 wherein in the ammonia soluble resin the polycarboxylic acid anhydride used to produce the thermoplastic derivative is tetrahydrophthalic anhydride.

9. The wax emulsion polishing composition of claim 3 wherein in the ammonia soluble resin the polycarboxylic acid anhydride used to produce the thermoplastic ester derivative is phthalic anhydride.

10. A wax emulsion system comprising from about one to about 15 parts by weight of a wax component, from about 1 to about 15 parts by weight of an ammonia-soluble comprising a thermoplastic ester derivative prepared by the process comprising the steps of (A) reacting together (1) a fusible, organic solvent soluble condensation product of a phenol and formaldehyde containing condensate units of a reactive phenolic hydroxyl group, said phenol being defined by the formula:

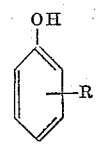

where R may H, F, Cl, Br or a suitable substituent selected from (a) alkyl groups of 1 to 18 carbon atoms, (b) alicyclic groups of 5 to 18 carbon atoms, (c) aromatic or aralkyl groups of 6 to 18 carbon atoms, (d) alkyl, alicyclic, aryl and aralkyl ketones wherein the respective hydrocarbon is defined as in (a), (b), and (c), (e) alkyl, alicyclic, aryl and aralkyl carboxylic groups wherein the respective hydrocarbon is defined as in (a), (b) and (c), and (f) mixtures thereof wherein when the phenol is a mixture of phenol itself and an above-defined substituted phenol the mole ratio of substituted phenol groups to phenol groups is between zero to one and about 0.75 to one, and (2) an alkylene oxide, in a proportion in the range of about one to about three moles of said alkylene oxide per phenolic hydroxyl group of said condensation product, to produce a hydroxy ether derivative containing substantially no free reactive phenolic hydroxyl groups, and (B) esterifying the hydroxy ether derivative by reacting it together with between about 0.8 and about one mole per hydroxyl equivalent of a polycarboxylic acid anhydride to produce a thermoplastic ester derivative which has an acid number above at least about 100, an emulsifying agent, and a diluent comprising water and an alkaline compound selected from the group consisting of ammonia, a volatile organic amine, and mixtures thereof, said wax emulsion system containing between about 5 and about 25 parts of total solids per hundred parts by weight of dispersion.

References Cited

UNITED STATES PATENTS

| | | | |
|---|---|---|---|
| 2,454,544 | 11/1948 | Bock et al. | 260—58 |
| 2,908,578 | 10/1959 | Barker | 260—28 |
| 2,918,440 | 12/1959 | Partansky | 260—58 |
| 3,108,087 | 10/1963 | Kirkpatrick et al. | 260—58 |
| 3,143,431 | 8/1964 | Kaupp et al. | 260—28 |

MORRIS LIEBMAN, *Primary Examiner.*

JULIUS FROME, *Examiner.*

B. A. AMERNICK, *Assistant Examiner.*